US007838765B2

(12) United States Patent
Mahapatra (10) Patent No.: US 7,838,765 B2
(45) Date of Patent: Nov. 23, 2010

(54) ELECTRICAL CONDUCTING WIRE HAVING LIQUID CRYSTAL POLYMER INSULATION

(75) Inventor: Amaresh Mahapatra, Acton, MA (US)

(73) Assignee: Linden Photonics, Inc., Westford, MA (US)

( * ) Notice: Subject to any disclaimer, the term of this patent is extended or adjusted under 35 U.S.C. 154(b) by 311 days.

(21) Appl. No.: 12/148,695

(22) Filed: Apr. 22, 2008

(65) Prior Publication Data

US 2010/0025074 A1 Feb. 4, 2010

Related U.S. Application Data

(60) Provisional application No. 60/926,195, filed on Apr. 25, 2007.

(51) Int. Cl.
*H01B 7/00* (2006.01)
(52) U.S. Cl. ...................................... 174/36
(58) Field of Classification Search ............ 174/110 R, 174/113 R, 120 R, 120 SC
See application file for complete search history.

(56) References Cited

U.S. PATENT DOCUMENTS

| 5,104,966 | A | | 4/1992 | David | |
| 5,396,104 | A | | 3/1995 | Kimura | |
| 6,064,007 | A | * | 5/2000 | Bernstein et al. | 174/110 R |
| 6,781,063 | B2 | | 8/2004 | Kim et al. | |
| 2005/0199414 | A1 | * | 9/2005 | Kim et al. | 174/110 R |

FOREIGN PATENT DOCUMENTS

JP 1122506 5/1989
JP 2002146120 5/2002

OTHER PUBLICATIONS

Aircraft Wire Degradation Study, FAA Contract DTFA03-02-C-00040, 2002.
GAO Report GAO-02-77, 2002. "Aviation Safety FAA and DOD Response to Similar Safety Concerns", January.
Haack, U., et al, 1993. "Non-Contact Marking by Laser Beam." Kunstoffe, V. 83, No. 7, pp. 878-882.
Heltxel, S. and Semprimoschnig, C.O.A., 2004. "A detailed study on the thermal endurance of Kapton HN™ and Upilex S". High Performance Polymers, V 16, pp. 235-348.
Linzey, W., McCutchan, M. and Traskos, M. "Evaluation of risk and possible mitigation schemes for previously unidentified hazards." 9th Joint FAA/DoD/NASA 2006 Aging Aircraft Conference, Mar. 6-9.
Lusignea, R.W, 1997. "Liquid Crystal Polymers: New barrier materials for packaging." Packaging Technology, Oct.
Osborne, D.T., 2006. " The Effect of Fuel Particle Size on the Reaction of Al/Teflon Mixtures." MS Thesis submitted to the Texas Tech University, Mechanical Engineering, May.

* cited by examiner

*Primary Examiner*—William H Mayo, III
(74) *Attorney, Agent, or Firm*—Francis J. Caufield (57) ABSTRACT

An electrically conducting wire structure and a method for its manufacture where the wire structure has at least one elongated electrically conducting wire and a liquid crystal polymer coating of insulation formed by cross-head extrusion as a layer around the electrically conducting wire. An abrasion layer is preferably formed over the liquid crystal polymer coating, the elongated electrically conducting wire is selected from the group that includes copper, silver, tinned copper, aluminum, and conducting polymers, and the liquid crystal polymer material is a thermotropic thermoplastic.

6 Claims, 9 Drawing Sheets

ELECTRICAL CONDUCTING WIRE HAVING LIQUID CRYSTAL POLYMER INSULATION

CROSS REFERENCE TO RELATED APPLICATION

This application claims the benefit of priority from U.S. Provisional Patent Application No. 60/926,195 filed on Apr. 25, 2007 in the name of Amaresh Mahapatra and entitled ELECTRICAL CONDUCTING WIRE HAVING LIQUID CRYSTAL POLYMERIC INSULATION, the entire contents of which are incorporated herein by reference.

FIELD OF THE INVENTION

This invention generally relates to structures and methods for fabricating insulated electrical conducting wires that can be used in high temperature environments, harsh chemical environments, salt-spray environments, and environments in which low flammability is a requirement. More particularly, it relates to providing electrical conduction wire, e.g., metal wire, with extruded liquid crystal polymer (LCP) insulation to enable use in the above environments.

BACKGROUND OF THE INVENTION

Commercial and military aircraft have stringent requirements for wire harnesses used on board for electrical connectivity to transfer power and electrical signals. Wiring in these applications is subjected to high temperature, fuel vapors, and vibration, all, or any of which, can cause the wire to degrade with time and produce serious and potentially catastrophic failures. Replacing wiring routinely after a certain time is essential, but costly.

One of the sources of wiring degradation is hydrolysis and is a potential problem for any insulation using aromatic polyimide (e.g., Kapton). Kapton, introduced in 1993 and still in current use in wire harness technology in Teflon-Kapton-Teflon (TKT) composite tape, Kapton composites also still have significant performance issues. Kapton-H has been replaced with Teflon-T (Dupont trade name OASIS, U.S. Pat. No. 5,104,966; also see U.S. Pat. No. 6,781,063 B2) which has reduced, but not eliminated the hydrolysis problem.

Figure 1A:
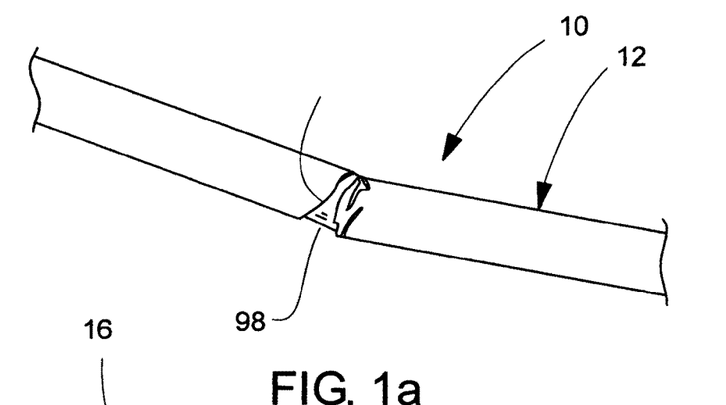
FIG. 1a is a diagrammatic view of conducting wire having a crack in its insulation.

Hydrolysis is a process by which prolonged exposure to moisture alters the composition of insulation and diminishes its integrity, weakening it to the point where it develops cracks (See FIG. 1). At high temperatures, current can arc between cracks that have developed close together. Arcing causes the insulation to carbonize, which further increases the probability of arcing. Often carbonization is so severe that arcing will set the insulation on fire, and the carbonized length acts like a fuse so that burns propagate down the harness thus compromising entire sections of the harness (See FIG. 2).

Polymer materials are increasingly being used in a wide range of applications in marine and outdoor environments. Often PVC is used as insulation and wire size can vary from 16 AWG (0.050" diameter) to 8 AWG (0.13" diameter). Such wire can be used for internal wiring of electrical equipment, internal wiring of panels and meters, and point to point wiring. The wire can be either stranded (cable) or single conductor.

Wiring used in marine applications, such as recreational watercraft, degrades with time from exposure to salt, moisture, and vibration. Over a period of ten to fifteen years, the insulation essentially becomes porous and the metal conductors corrode, often resulting in mechanical failures as well. Another failure mode is the gradual change in surface chemistry from moisture and contamination so that the surface goes from being hydrophobic to hydrophilic. The modified surface then permits the development of electrical arcing that leads to flashover and on-board fires.

Numerous organizations are developing and implementing new testing requirements to measure the flame propagation characteristics of tray cables and the toxic gases generated during combustion of wire and cable used in building plenums. The establishment of a new flame testing criteria for tray cables may eliminate some cable constructions presently permitted in cable tray. Introduction of new materials that either are more flame retardant, produce less smoke, or generate less corrosive or toxic gases will be needed to meet new regulations.

Therefore, there is a widespread need for new wiring insulation constructions that survive for tens of years in high temperature environments, harsh chemical environments, salt-spray environments and environments in which low flammability is a requirement. The solutions must also be cost effective.

Consequently, there is a pressing need for an electrically conducting wire that is provided with a robust insulation that can withstand the rigors of moisture laden environments, salt water environments, and high temperature and vibration environments while remaining highly resistant to abrasion, and it is a principal object of this invention to provide such structures and methods and materials for fabricating them.

Other objects of the invention will be obvious and will appear hereinafter when the following detailed description is read in connection with the accompanying drawings.

SUMMARY OF THE INVENTION

This invention relates to an electrically conducting wire structure and a method for its manufacture where the wire structure has at least one elongated electrically conducting wire and a liquid crystal polymer coating of insulation formed by cross-head extrusion as a layer around the electrically conducting wire. An abrasion layer is preferably formed over the liquid crystal polymer coating to increase abrasion resistance, the elongated electrically conducting wire is selected from the group comprising copper, silver, tinned copper, aluminum, nickel, silver plated copper, and conducting polymers, and the liquid crystal polymer material comprises a thermotropic thermoplastic.

The method for manufacturing the electrically conducting wire structures having exterior insulation of liquid crystal polymer comprises the steps of: providing a cross-head extruder having a die; melting a liquid crystal polymer and flowing it into said cross head extruder; feeding at least one electrically conducting wire through said cross head extruder die to coat said electrically conducting wire with a layer of liquid crystal polymer insulation; cooling the coated liquid crystal polymer insulation layer as the electrically conducting wire structure emerges from said crosshead extruder; and storing said coated electrically conducting wire structure on a storage spool.

BRIEF DESCRIPTION OF THE DRAWINGS

The structure, operation, and methodology of the invention, together with other objects and advantages thereof, may best be understood by reading the detailed description in connection with the drawings in which each part has an assigned a label and/or numeral that identifies it wherever it appears throughout the various drawings and wherein.

DETAILED DESCRIPTION

This invention relates to electrically conducting wire structures and methods for their manufacture where the wire structures have at least one elongated electrically conducting wire and a liquid crystal polymer (LCP) coating of insulation formed by cross-head extrusion as a layer around the electrically conducting wire to provide it with properties for resisting the rigors of moisture laden environments, salt water environments, and high temperature and vibration environments while remaining highly resistant to abrasion.

Figure 1B:
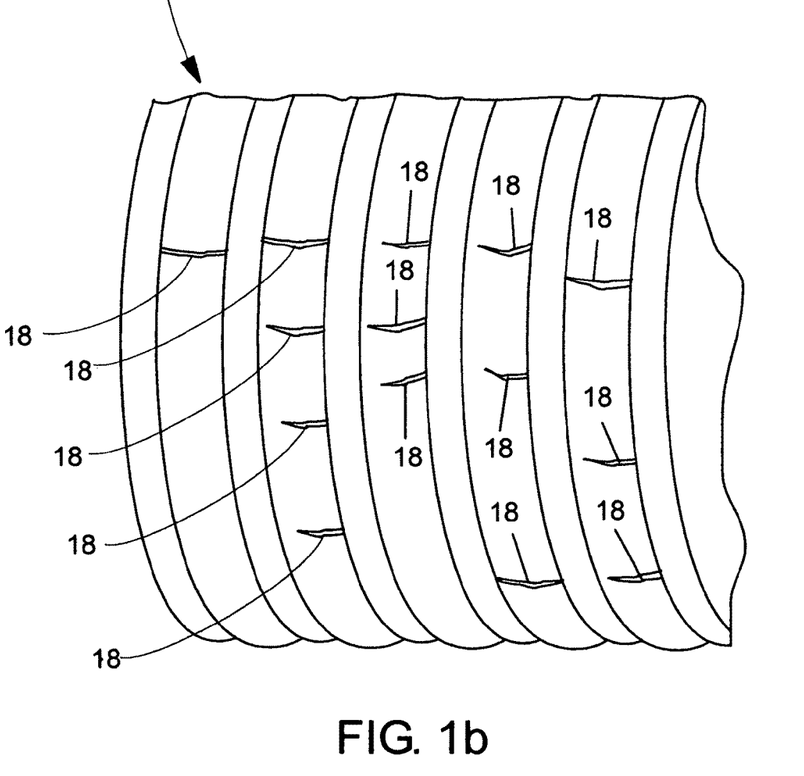
FIG. 1b is a diagrammatic view illustrating cracks in a wire harness that has been exposed to heat and humidity (Aircraft Wire Degradation Study, 2002)
Figure 2:
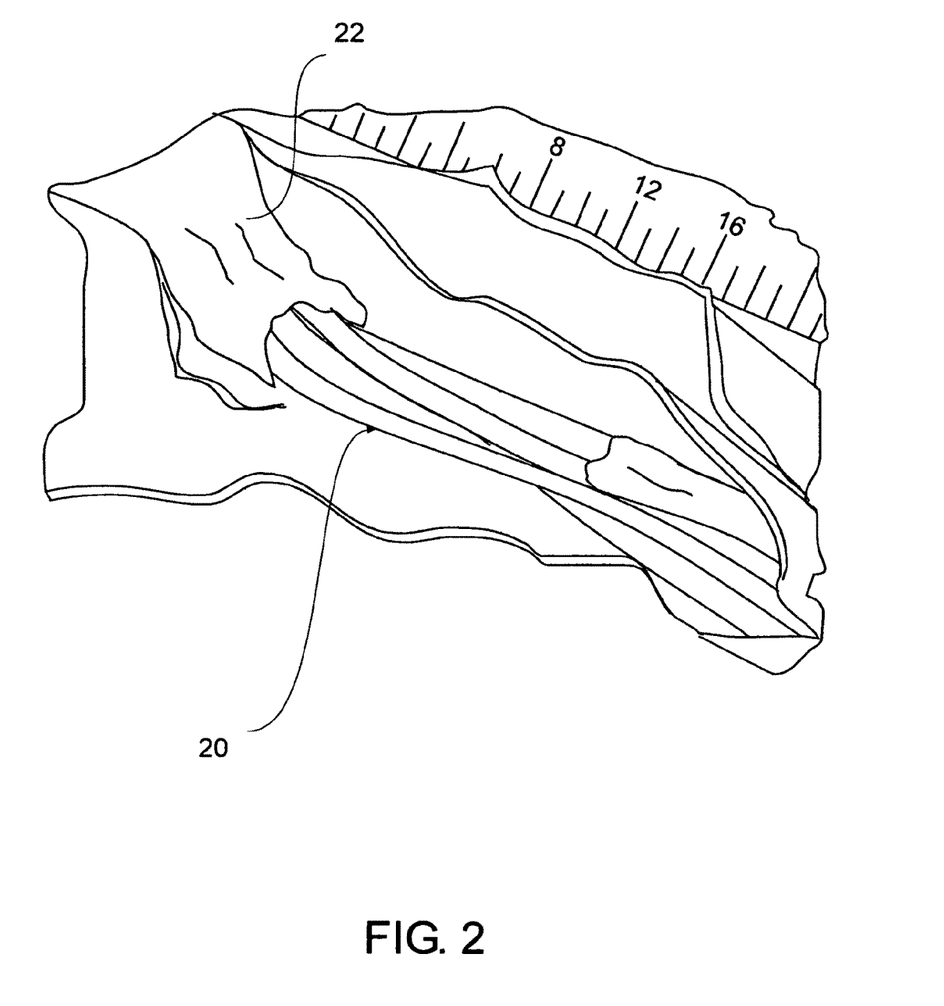
FIG. 2 is diagrammatic rendering of a photograph illustrating arc tracking damage in a wire bundle (Linzey, W., 2006)

The invention addresses the problem of insulation cracking caused by hostile environments in which conducting wire structures are used. The results of exposure to such environments are illustrated in FIGS. 1a, 1b, and 2. As seen in FIG. 1a, there is shown a diagrammatic view of a conducting wire structure 10 having a crack in its insulation 12 exposing its internal conductor 14 thus permitting undesirable potential contact with its surroundings. FIG. 1b diagrammatically illustrates a wire harness 16 having cracks 18 caused by exposure to heat and humidity (Aircraft Wire Degradation Study, FAA Contract DTFA03-02-C-00040, 2002) with similar potential danger. FIG. 2 is diagrammatic rendering of a photograph illustrating actual arc tracking damage in a wire bundle with cracks (Linzey, W., McCutchan, M., and Traskos, M. "Evaluation of risk and possible mitigation schemes for previously unidentified hazards." 9th Joint FAA/DoD/NASA 2006 Aging Aircraft Conference, March 6-9). To address these problems, LCP insulation, along with other layers, has been found beneficial.

The use of polymers with high temperature stability in the electronic industry is not new. For instance, polyimide, which is stable to 350° C., has been used for fabrication of flexible circuits in electronic assemblies, but it tends to absorb moisture which interferes with high frequency performance. Liquid crystal polymer (LCP), has been shown to have excellent moisture and oxygen barrier properties. Compared to polyimide, LCPs have a factor of 100 lower moisture absorption and transmission, while being chemically stable to 450° C. LCPs also have a low dielectric constant and loss factor from 1 kHz to 45 GHz.

One of the characteristics of LCPs is related to how they flow in the molten state. When in the molten or solvated state, LCP molecules tend to align along their length like a crystal (Lusignea, R. W, 1997. "Liquid Crystal Polymers: New barrier materials for packaging." Packaging Technology, October.). The liquid crystal state results from the rigid-rod nature of the LCP molecules, which tend to stack up like logs parallel to each other. Because LCPs are thermoplastic, there is an intermediate temperature such that the LCP is made fluid without break down of the crystal structure. Table 2 shows typical film properties of LCP versus polyethylene terephthalate (PET) films.

TABLE 2

Comparison of barrier properties of PET and LCP (Lusignea, 1997)

|  | Biaxially-oriented PET film | LCP Film |
|---|---|---|
| Tensile strength (kPa) | 172,000 | 240,000 |
| Tensile modulus (106 kPa) | 5.2 | 12.4 |
| Oxygen permeability (cc · mil/m$^2$-24 hr.-atm.) | 78 | 0.23 |
| Water vapor transmission rate (gm · mil/m$^2$-24 hr.-atm) | 28 | 0.17 |
| Density (gm/cc) | 1.4 | 1.4 |
| Tear resistance, Initiation, kN/m | 35 | 595 |
| Tear resistance, Propagation, kN/m | 9 to 53 | 175 to 525 |

The crystalline structure of LCP prevents the absorption of moisture or other gases. Because LCPs are thermoplastic, this means that LCP structures can be formed by processes such as molding and extrusion and never from solution. Therefore, LCP structures do not out-gas.

As discussed below, LCPs will pass key tests specified in regulatory qualification requirements for military and commercial applications.

Figure 3:
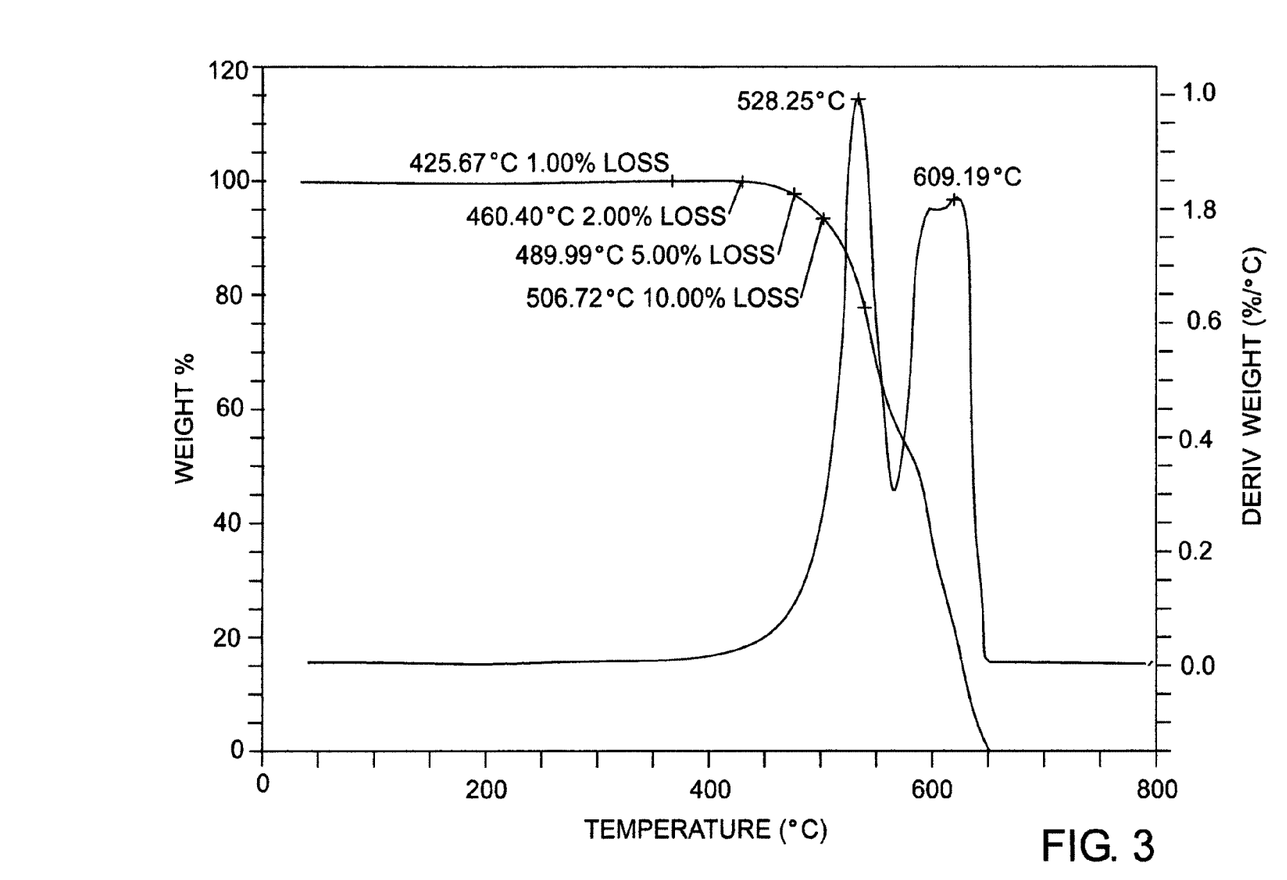
FIG. 3 is a graph of a Thermo Gravimetric Analysis (TGA) showing mass loss as a function of temperature for Solvay's XYDAR SRT-400 LCP.

For example, LCPs have demonstrated thermal stability as mass loss measurements indicate. As is known, thermo Gravimetric Analysis (TGA) measures mass loss as a function of temperature and is a good determinant of highest operating temperature. TGA for Solvay Chemical's Xydar SRT-400 grade LCP (See FIG. 3) shows that a 1% weight loss, drop from 100% to 99%, occurs at 426° C. Currently used aircraft harness has a qualification requirement of 260° C.

Figure 4:
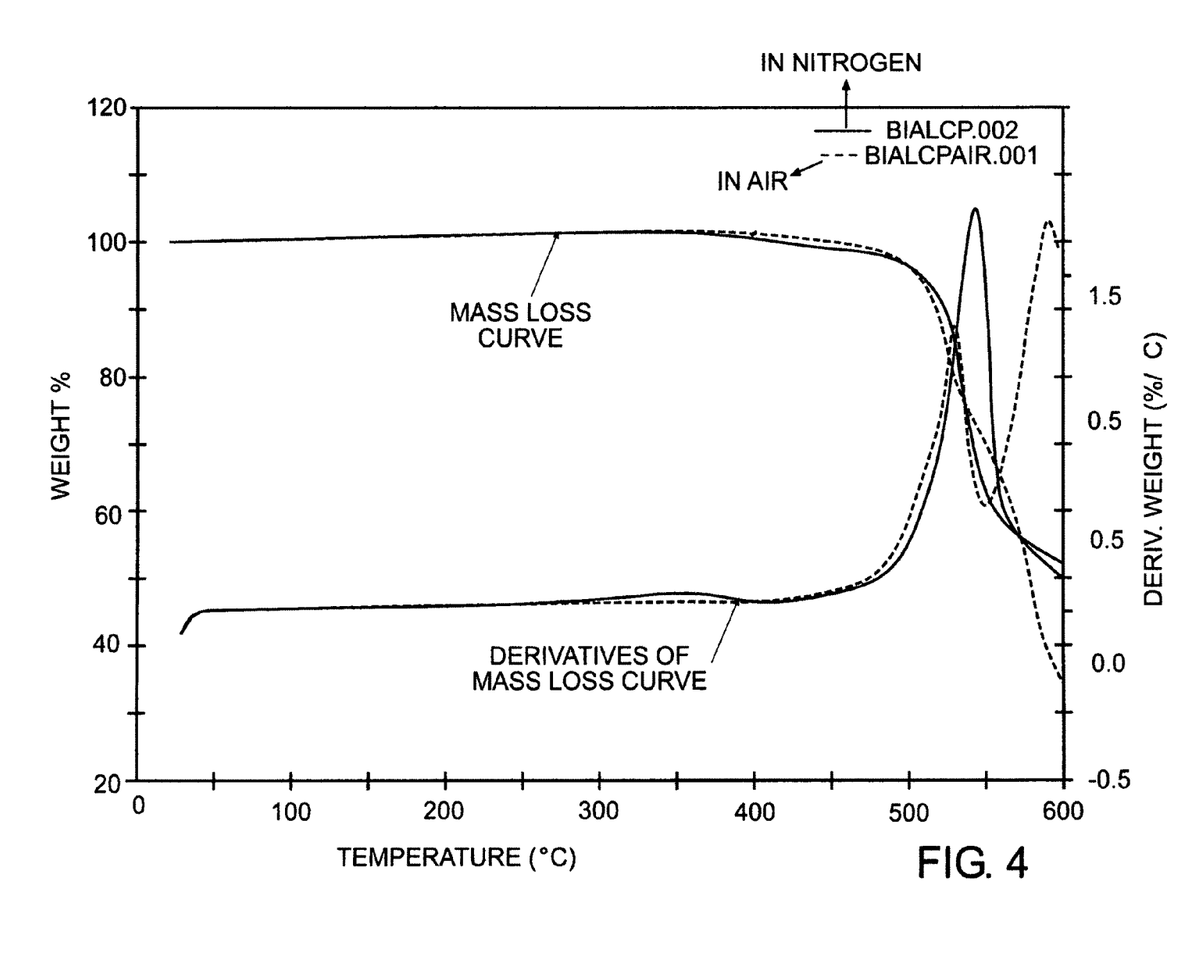
FIG. 4 is a graph showing TGA measurements for Vectra A950 LCP (Measurement by Linden Photonics, Inc., Westford, Mass.)
Figure 5:
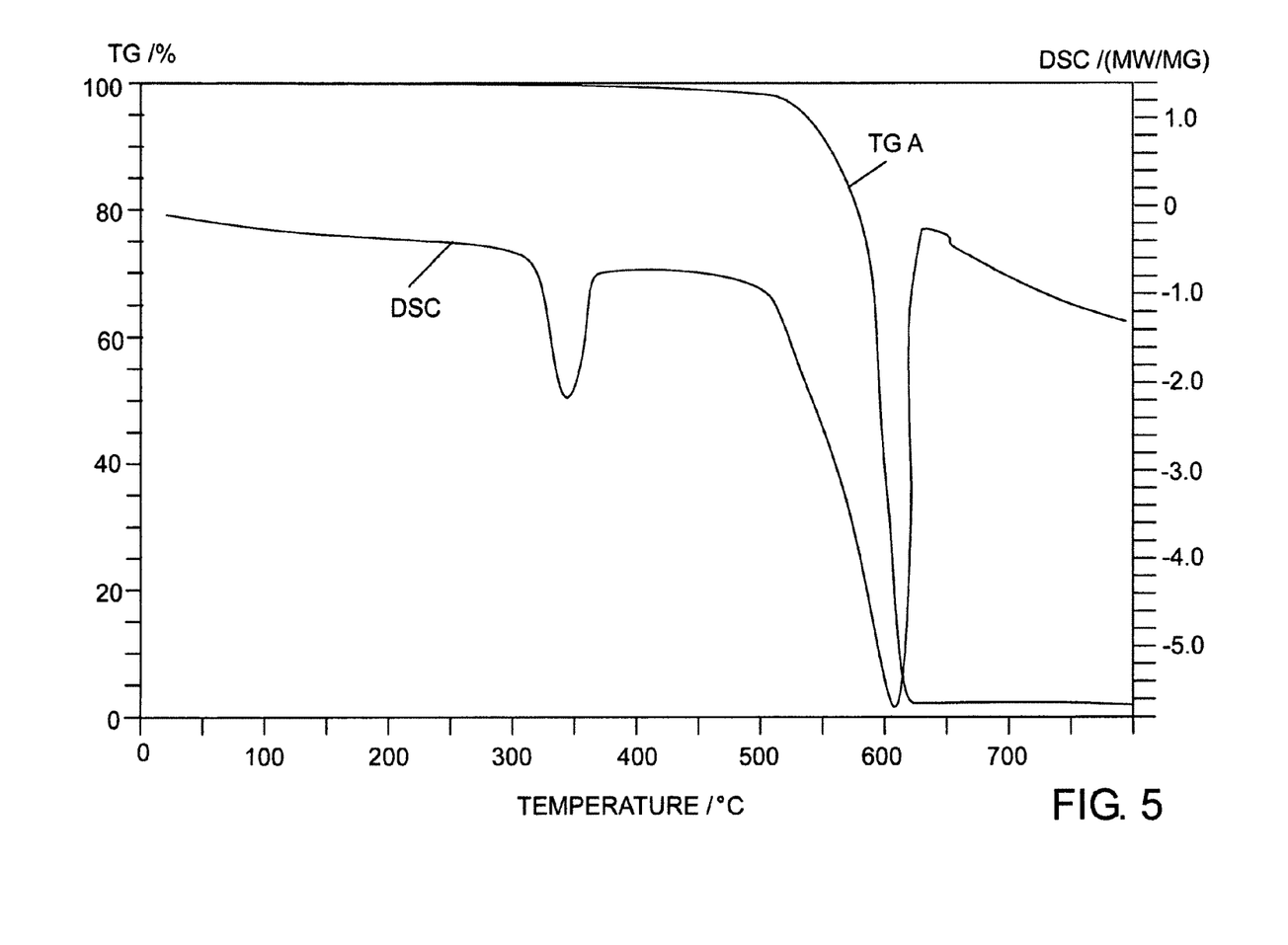
FIG. 5 is a graph of differential scanning calorimetry (DSC) and TGA measurements for Teflon (Osborne, 2006)
Figure 6:
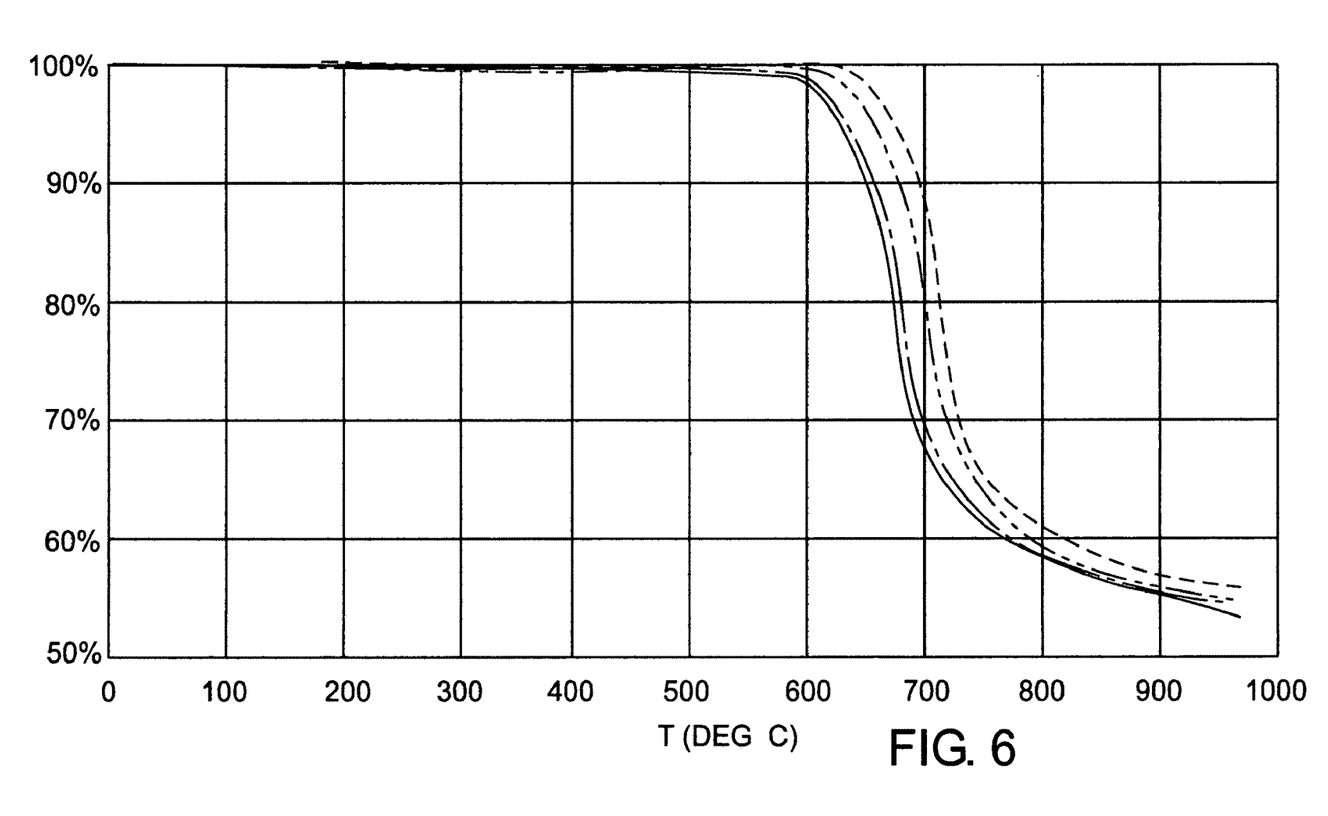
FIG. 6 is a graph illustrating TGA Scanning measurements of Kapton-HN (Heltxel, 2004)

TGA of Vectra (A950) LCP has been preformed, both in air and nitrogen atmosphere (See FIG. 4). The masses of the samples were between 1 and 2 milligrams at the beginning of the experiment, and the heating rate was set to 10° C. per minute. For comparison, TGA for Teflon and Kapton-HN (used in the popular Teflon/Kapton/Teflon composite insulation) are shown in FIG. 5 (Osborne, D. T., 2006. "The Effect of Fuel Particle Size on the Reaction of Al/Teflon Mixtures." MS Thesis submitted to the Texas Tech University, Mechanical Engineering, May) and FIG. 6 (Heltxel, S. and Semprimoschnig, C.O.A., 2004. "A detailed study on the thermal endurance of Kapton HN™ and Upilex S". High Performance Polymers, V16, pp. 235-348).

The thermal properties of Xydar LCP, Teflon and Kapton HN are summarized in Table 3 which shows that LCP meets the required 260° C. temperature rating.

TABLE 3

Comparison of TGA results

| Material | Temperature for 1% weight Loss (° C.) | Comments |
|---|---|---|
| Teflon | 500 | Cannot be Extruded |
| Kapton-HN | 425 | Cannot be extruded |
| Xydar, Vectra LCP | 430 | Thermoplastic - can be extruded. |

Vectra LCPs are also inherently flame retardant and self-extinguishing. When exposed to very high flame temperatures, the fully aromatic polymers form a carbon char layer, which retards the development of flammable gases. Vectra LCPs have a self-ignition temperature of over 538° C. The flammability test in MIL-W-22759/43 exposes a section of the wire to a 3" conical flame at a temperature of 950° C. at its hottest point. The tip of the flame is applied to a fixed point on the wire for 30 seconds and then the flame is removed. If the insulation catches fire, the flame must self-extinguish after a maximum of 3 seconds and travel a maximum of 3". Flammability testing similar to the one required in MIL-W-22759/43 is specified in UL 94V vertical burn testing.

The Limiting Oxygen Index (LOI) is the minimum amount of oxygen as a percentage in air at which the combustion of the polymer will continue after ignition without an additional source of energy. The LOI of Vectra LCPs ranges from 40% to 50%. Thermal properties of high temperature insulation used in aircraft harness and LCP is compared in Table 40.

TABLE 4

Comparison of thermal properties of insulation material

| Insulation | Melting Point (° C.) | Heat Deflection Temperature (° C.) | Flammability | Limiting Oxygen Index (LOI, %) |
|---|---|---|---|---|
| Kapton | None | Not specified | 94 V-0 | 37 |
| Teflon (PTFE) | 322 | 56 | 94 V-0 | 95 |
| Nylon | 249-266 | 70 | 94 V-2 | 26 |
| LCP | 280 | 300 | 94 V-0 | 40-50 |

All polymers with a flammability index 94 V-0 are expected to pass flammability requirements.

Immersion testing for chemical resistance is also required. The immersion test in MIL-W-22759/43 requires immersion of a section of wire in specified fluids at 50° C. for 20 hours or more and comparison of the diameter and bend tolerance of the wire before and after immersion.

Vectra LCPs have good resistance to chemicals, particularly organic solvents (even at high temperatures), cleaning agents normally used in the electronics industry, and chemicals used for sterilization in the health care industry. The resistance of Vectra LCPs to methanol and methanol containing fuels depends very much on the temperature and the degree of contact. The results of testing by Ticona in various chemicals and fuels are given in Table 5. For the measurements, five injection molded test specimens (127 mm×12.7 mm×3.2 mm) were immersed in the medium for a given period of time without any externally induced stress. The additional effect of mechanical stresses could alter the results. Changes in weight and dimensions, flexural strength, flexural modulus and hardness were measured. Changes in concentration, temperature of exposure or the addition of additives can significantly affect the results. Nonetheless, it appears that LCPs will pass the MIL-W-22759/43 immersion tests.

TABLE 5

Chemical Resistance of Vectra LCP.

| Fluid | Conditions | Vectra LCP grade | Rating |
|---|---|---|---|
| Acetone | 180 days/56° C. | A950 | + |
| Methylene chloride | 180 days/40° C. | A950 | + |
| Nitric acid | 60 days/70° C. | A950 | + |
| Chromic acid (70%) | 30 days/88° C. | A950 | + |
| Sulfuric acid (50%) | 180 days/88° C. | A950 | + |
| Lead free gasoline | 30 days/121° C. | A950 | + |
| Lead free gasoline + 10% methanol | 30 days/121° C. | A950 | o |
| Engine oil, 10W-30 | 30 days/121° C. | A950 | + |

Rating:
+ Resistant - less than 2% change in weight and dimension, less than 5% change in mechanical properties.
o Limited resistance. – Not resistant Another property that is important for wire structures to have is moisture and humidity resistance. The moisture absorption and moisture transmission rate of LCP, polyimide and Teflon are compared in Table 6. Clearly LCPs are much more moisture resistant than polyimide, nylon and Teflon.

TABLE 6

Moisture absorption and transmission of LCP and other high temperature wire insulation

| Material | Moisture absorption, 24 hr. immersion (%) | Water Vapor Transmission Rate (WVTR) (cc-mil/100 in²-24 hr-atm) | $O_2$ transmission rate (cc-mil/100 in²-24 hr-atm) |
|---|---|---|---|
| Polyimide | 2.8 | 100000 | 25 |
| Nylon | 2.1-4 | 356 | 88.9 |
| Teflon (PTFE) | 0.03 | 373 | |
| LCP | 0.04 | 0.4 | 0.1 |

Tensile strength of insulators also is important. The tensile strength of several LCP resins acquired from Ticona and Dupont have been measured. Table 7 compares the tensile strength of LCP and other common insulating materials. LCP is stronger than the others, and it is possible that thinner LCP insulation will meet strength requirements, thus reducing weight and cost.

TABLE 7

Tensile properties of LCP and other high temperature wire insulation

| Material | Tensile strength (kpsi) | Tensile modulus (kpsi) |
|---|---|---|
| Polyimide | 15 | 370 |
| Nylon | 12.3 | 537 |
| Teflon (PTFE) | 10 | |
| LCP | 22.2 | 1670 |

Markability of the insulation is extremely important. Harness identification marking often needs to be placed every 1 ft. or less. When operators want to examine wiring harness during repair or maintenance, viewing ports are small and the harness cannot be pulled out arbitrarily. Hence, high contrast and frequent marking along the length is essential.

Embossed thermal markings are not preferred since they degrade insulation strength and other properties. FAA wiring experts determined that an arc tracking event in a 1985 Monarch Airlines flight was triggered by damage to a wire bundle when it was marked with a hot stamping tool (GAO Report, 2002). Laser marking is the preferred method and Ticona has developed and demonstrated laser marking technology for their Vectra grade of LCPs (Haack, 1993). LCPs are best marked with excimer laser at 248 nm or 351 nm or by $CO_2$ laser using imaging via masks. Marking natural Vectra LCP, which has a off-white color, gives grey marking with Nd:YAG laser but a high contrast black marking with excimer laser. This method has been documented and is preferred for use in marking extruded LCP harness insulation.

Laser marking rapidly creates a durable, high contrast imprint for functional purposes. The contrast attained in this way is permanent and resistant to abrasion. It can be implemented in-line after extrusion, and the imprint can be quickly and easily changed as production specifications may require. Best results are obtained with resin formulations specially developed for laser marking use. Ticona's Vectra® liquid crystal polymer (LCP), can be laser marked using standard grades.

Figure 7:
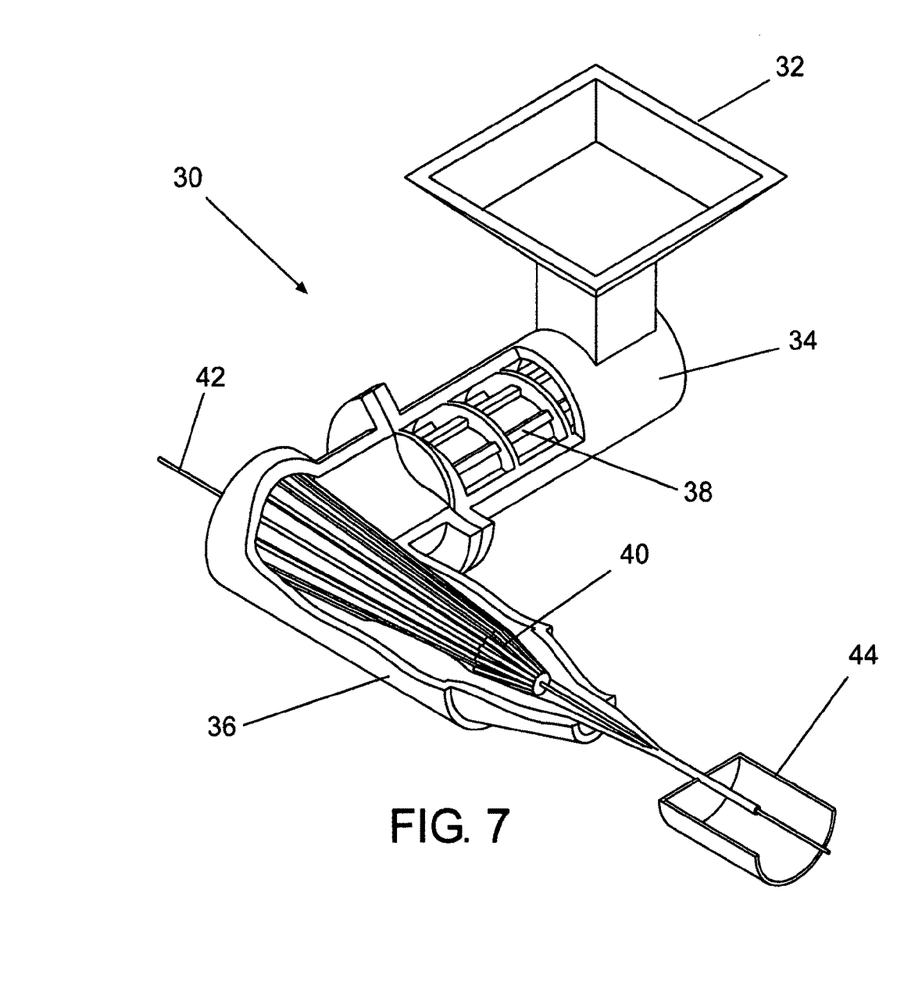
FIG. 7 is a diagrammatic perspective view, with parts broken away, showing a basic cross-head type extruder used to practice the invention.

Given the properties of LCP, the invention advocates the use of extruded LCP insulation on metal wire to fabricate wire harness for use in the hostile environments discussed earlier. Extrusion is a well-known manufacturing technology and will enable low-cost, high performance wire harness unlike composite tape type insulation currently used, which is inherently expensive to manufacture. The LCP insulating jacket on the metal wire is produced using a standard cross head extruder 30 similar to that illustrated in FIG. 7. The extruder operates as follows:

The dried resin is poured into a hopper, which is located above the barrel. The resin moves from the hopper 32 into the heated barrel 34 and is pushed into the crosshead 36 of the extruder by the feed screw 38. Before it enters the cross head 36, the now molten material passes thought a screen (or group of screens) which serves to filter out any particulate contaminants which may be present. The material then flows along the outside of a hollow stator 40, through which the wire 42 is fed. Finally, the molten material is extruded out of the cross head, through the die. At this point, the LCP is still molten, and the diameter of the extruded jacket continues to shrink as the material is pulled from the extruder 30. The jacketed wire then enters a water trough 44, where it is cooled rapidly, and the LCP hardens. In the present application, a thin jacket of around 1 to 5 mils on, for example, a 26 mil wire has been found appropriate. Other combinations of wire gauge and jacket thickness are well within the teachings of the invention and depend on anticipated environmental demands and material properties.

I have also developed a strong fiber optic cable that uses extruded LCP buffer layer on commercial single mode fiber to manufacture a cost effective, high strength optical cable (See United States Patent Application Publication No. US 2004/0240804 A1). Extrusion parameters for LCP such as screw temperatures, die head temperature, die design, screw speed etc. specific to LCPs have been determined therein and may be applied here.

Figure 8:
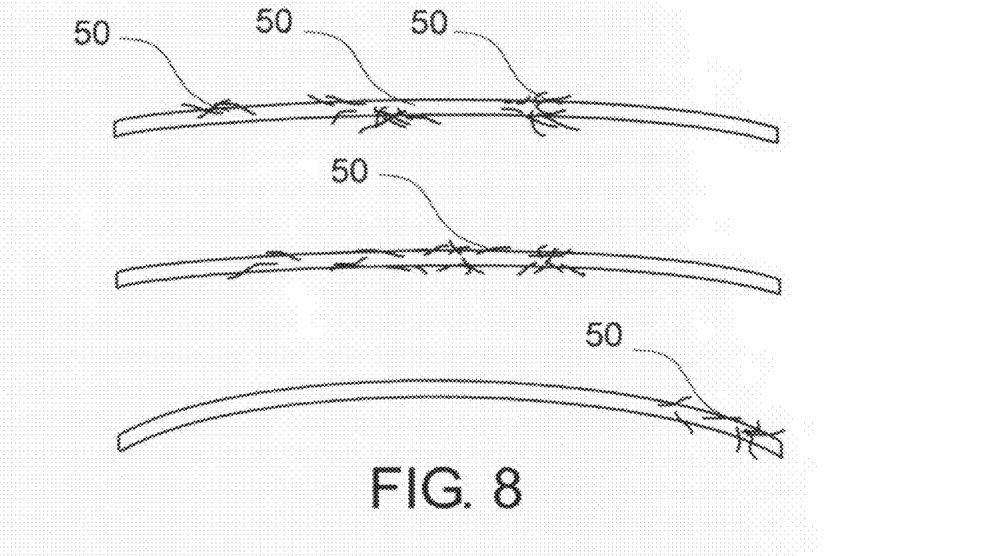
FIG. 8 is a diagrammatic rendering of a photograph illustrating cable samples after abrasion tests.
Figure 9:
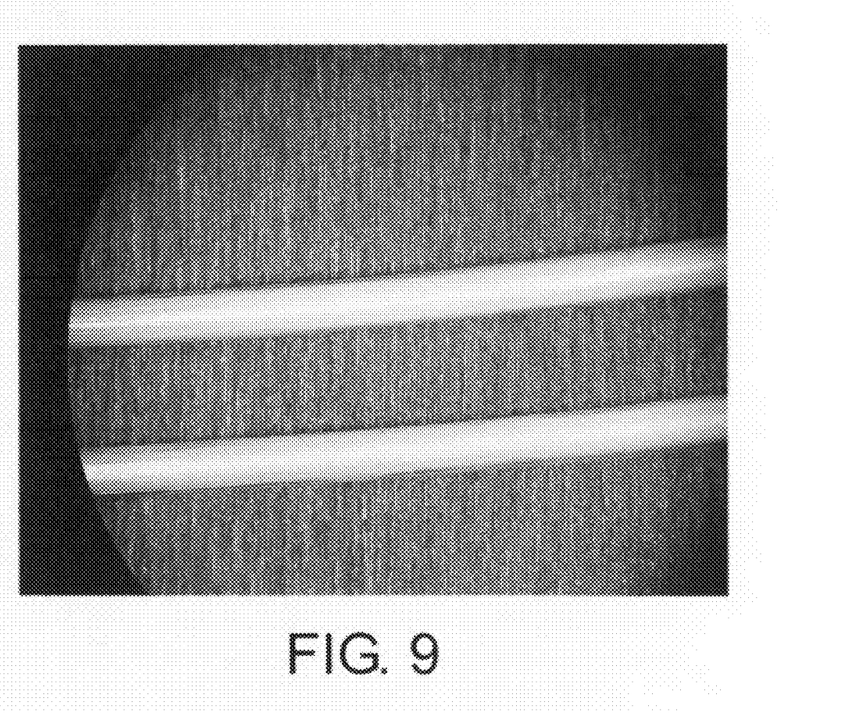
FIG. 9 is a photograph comparing abraded and unabraded nylon coated cables.

One problem encountered with some extruded LCPs is poor resistance to abrasion, since the LCP layer tends to separate into fibers 50 when abraded (See FIG. 8). For LCP buffered optical cables, abrasion resistance has been increased by extruding a thin layer of a thermoplastic, such as Nylon, over the LCP layer. FIG. 9 shows the improved abrasion resistance of such coated structures with the top fiber unabraded and the bottom abraded.

Similarly, abrasion resistance can be increased for wire harnesses by use of a secondary extruded thermoplastic layer using a cross-head extruder similar to that appearing in FIG. 7 modified for co-extrusion or serial extrusion. Nylon can be used, as above, but Nylon is a low temperature thermoplastic. To fabricate high temperature wire harness, thermoplastics such as FEP (Fluorinated Ethylene Propylene), Tefzel™ (modified ethylene-tetrafluoroethylene) and PFA (Perfluoroalkoxyethylene) may be used for the anti-abrasion layer. The melting temperature of these materials are shown in Table 8. Other fluoropolymers may also used.

TABLE 8

Melting temperatures of some candidate abrasion resistant thermoplastics

| Thermoplastic | Melting Temperature (° C.) |
|---|---|
| FEP (Fluorinated Ethylene Propylene) | 260 |
| Tefzel ™ (modified ethylene-tetrafluoroethylene) | 267 |
| PFA (Perfluoroalkoxyethylene) | 360-420 (grade dependant) |

Simple laboratory tests have also been performed to determine adhesion of LCP to typical metal wires used in wiring such as copper, tinned copper and silver wire. An aluminum foil cup with pellets of A950 LCP resin from Ticona was placed on a laboratory hot plate and heated to about 450° C. as measured by a surface thermometer. The melting temperature of the A950 LCP is 280° C. Once the pellets melted, wires of copper, silver and tinned copper were sequentially inserted into the melt for 5 minutes each and removed. LCP adhered to the metal wires well.

Figure 10:
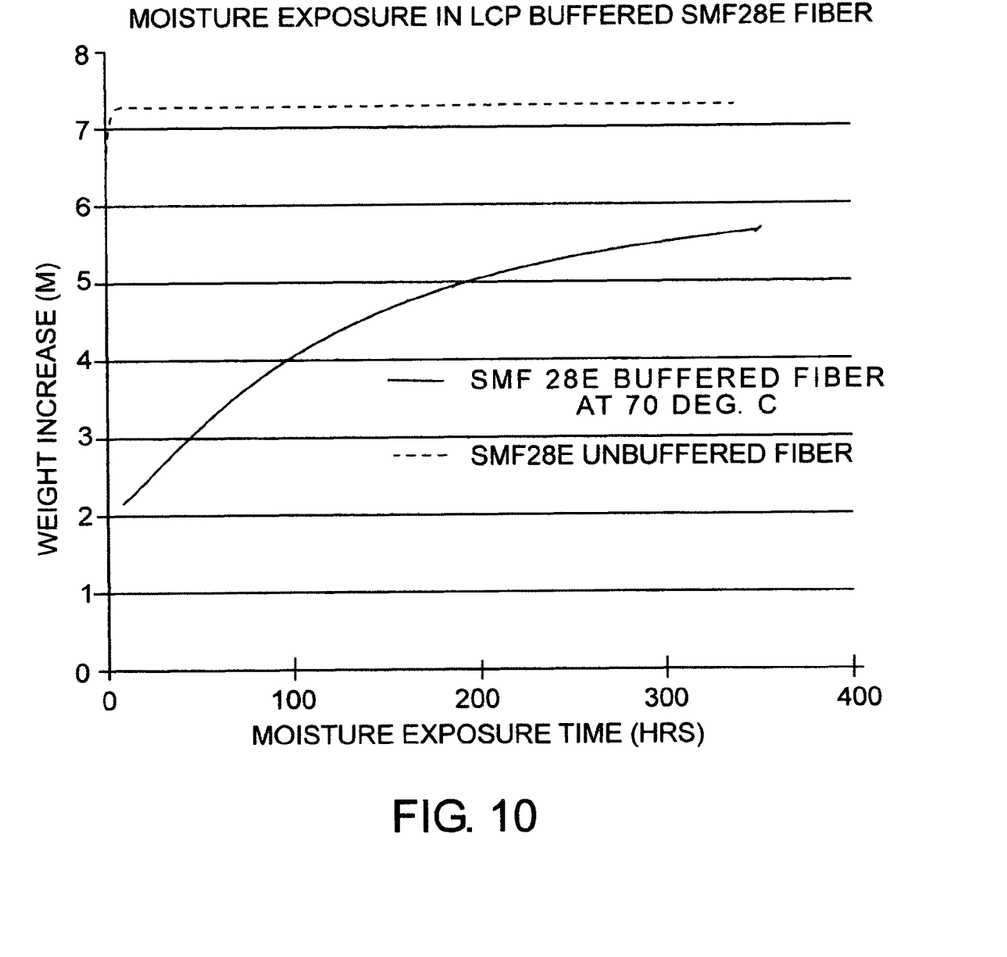
FIG. 10 is a graph illustrating moisture absorption vs. time in bare SMF28 fiber and LCP buffered SMF28 optical fiber.

Temperature accelerated moisture absorption measurements of LCP buffered SMF28 optical cable have also been performed. The acrylate buffer on commercial SMF28 rapidly absorbs 3% moisture by weight. LCP buffer applied on top of the acrylate, by my process, impedes the absorption of moisture significantly. The dashed line in FIG. 10 shows moisture absorption of acrylate buffered fiber at room temperature while the solid line shows the moisture absorption in the same fiber with secondary LCP buffer at 70° C. The acrylate buffered fiber reaches saturation within minutes even at room temperature while the LCP buffered fiber at 70° C. has not saturated even after 350 hours. This illustrates how impervious LCP is to moisture. This property will also manifest itself when LCP is used as insulation for metal wire.

Other variants of the invention will occur to those skilled in the art given its disclosure and teachings. For example, it is thoroughly possible to cross-head extrude flat, ribboned versions of cable harness in which two or more conducting wires reside side by side. Circular, rectangular, or other geometric architectures are also possible for cable arrangements in where the cable comprises more than one wire. In addition, LCP insulation layers may be used with polymeric electrically conducting wire. Additionally LCP may be extruded directly on the conductor or on top of other insulating layers that have already been applied to the conductor.

What is claimed is:

1. An electrically conducting wire structure consisting essentially of:
   at least one elongated electrically conducting wire; and
   a liquid crystal polymer coating of insulation directly formed as a layer around said electrically conducting wire by cross-head extrusion, said liquid crystal polymer coating having molecules aligned substantially parallel to one another along the length of said elongated electrically conducting wire.

2. The electrically conducting wire structure of claim 1 further including an abrasion layer formed over said liquid crystal polymer coating to increase the abrasion resistance of said electrically conducting wire structure.

3. The electrically conducting wire structure of claim 2 wherein said abrasion layer is selected from the group consisting of Nylon and fluoropolymers.

4. The electrically conducting wire structure of claim 1 wherein said elongated electrically conducting wire is selected from the group consisting of copper, silver, tinned copper, aluminum, nickel, silver plated copper, and conducting polymers.

5. The electrically conducting wire structure of claim 1 wherein said liquid crystal polymer coating material is a thermotropic thermoplastic.

6. A method for manufacturing electrically conducting wire structures having a liquid crystal polymer exterior insulation layer, said method comprising the steps of:

providing a cross-head extruder having a die;

melting a liquid crystal polymer and flowing it into said cross head extruder;

feeding at least one electrically conducting wire through said cross head extruder die to directly coat said electrically conducting wire with a layer of liquid crystal polymer insulation so that the molecules thereof are aligned substantially parallel to one another along the length of said electrically conducting wire;

cooling the coated liquid crystal polymer insulation layer as the electrically conducting wire structure emerges from said crosshead extruder; and storing said coated electrically conducting wire structure on a storage spool.

* * * * *